United States Patent [19]

Bard et al.

[11] Patent Number: 4,853,167
[45] Date of Patent: Aug. 1, 1989

[54] METHOD FOR MAKING LEAD PENCILS AND COLORED PENCILS

[75] Inventors: Martin Bard, Amberg; Rosemarie Rieger; Isfried Petzenhauser, both of Rodental, all of Fed. Rep. of Germany

[73] Assignee: Buchtal GmbH, Schwarzenfeld, Fed. Rep. of Germany

[21] Appl. No.: 164,125

[22] Filed: Mar. 4, 1988

[30] Foreign Application Priority Data

Mar. 4, 1987 [DE] Fed. Rep. of Germany ....... 3706977

[51] Int. Cl.$^4$ ..................... B29C 47/02; B29C 47/04; B29C 67/00; C09D 13/00
[52] U.S. Cl. ..................... 264/112; 106/19; 106/105; 106/106; 264/122; 264/172; 264/211.11; 264/246; 264/320; 264/323; 523/164
[58] Field of Search ................... 264/172, 211, 211.11, 264/211.12, 245, 246, 320, 323, 122, 112; 423/448; 106/19, 105, 106; 523/164; 524/451, 495

[56] References Cited

U.S. PATENT DOCUMENTS

| | | | |
|---|---|---|---|
| 53,092 | 3/1866 | Sorel | 106/106 |
| 346,002 | 7/1886 | Waite | 106/19 X |
| 449,151 | 3/1891 | Enricht | 106/106 |
| 1,282,188 | 10/1918 | Catlett | 106/105 X |
| 1,308,932 | 7/1919 | Catlett | 106/105 X |
| 1,368,949 | 2/1921 | Loeffelhardt | 106/106 |
| 1,726,472 | 8/1929 | Catlett | 106/105 X |
| 1,811,799 | 6/1931 | Lukens | 106/106 |
| 2,466,145 | 4/1949 | Austin et al. | 106/106 |
| 2,526,837 | 10/1950 | Woodward | 106/106 X |
| 2,645,582 | 7/1953 | Loy | 106/19 |
| 2,790,202 | 4/1957 | Lorenian | 264/172 |
| 4,017,451 | 4/1977 | Ishioa et al. | 523/164 |
| 4,668,572 | 5/1987 | Iizuka et al. | 106/19 X |
| 4,758,540 | 7/1988 | Bard et al. | 106/19 X |

*Primary Examiner*—Jeffery Thurlow
*Assistant Examiner*—Leo B. Tentoni
*Attorney, Agent, or Firm*—Kinney & Lange

[57] ABSTRACT

A method for making pencil leads without firing includes taking mixtures of graphite and MgO which are made of Mg salts with MgCl$_2$ solutions, forming such mixtures into desired shapes (crayons or pencil leads) and hardening them at room temperatures. Colored pencil leads are produced by processing MgO with inorganic or organic colors together with slip additives and MgCl$_2$ solutions into pressable pastes, and then forming them into leads or crayons for room temperature hardening. To increase breakage resistance, the resulting leads or crayons are encased in wood. The MgCl$_2$ solutions are mixtures of Sorel's cement, and the slip additive is talcum.

11 Claims, No Drawings

४,853,167

METHOD FOR MAKING LEAD PENCILS AND COLORED PENCILS

BACKGROUND OF THE INVENTION

1. Field of the Invention

The present invention relates to a method for making lead pencils and colored pencils.

2. Description of the Prior Art

It is known that pencil leads are produced by pressing into leads a moist graphite-clay mixture in which the clay part is between 25 and 75%, depending on the desired hardness. These leads are dried and then solidified by firing at temperatures about 1100° C. The firing is performed either using protective gas such as nitrogen or in graphite filling in order to prevent the graphite from burning in the leads. The writing properties of the leads thus produced may be improved by soaking the leads in binding and slip agents before encasing them in wood to increase resistance to breakage and improve handling.

It is also known that one can produce colored pencil leads whose colors would not tolerate burning by mixing synthetic materials such as cellulose derivates, e.g. carboxymethyl cellulose, nitrocellulose, ethyl and benzyl cellulose, with colors and slip additives and then pressing the mixture. Synthetic monomers such as styrene, methacrylic ester or thermoplastics such as polyvinyl chloride and polyvinyl acetate are also stated as binder phases for the colors.

The quality of the colored pencil leads with organic binding is far lower than the quality of fired pencil leads.

According to one proposal, pencil leads may be fired at lower firing temperature of less than 550° C. if a mixture of graphite with enamel frit and quartz powder in a ratio of about 1:2 to 4:1 is used to make the leads. This is superior to the conventional production of pencil leads in that one can dispense with an inert gas atmosphere or a graphite filling, but one still requires a firing process with the necessary apparatus and fuel costs.

SUMMARY OF THE INVENTION

The invention is based on the problem of improving the quality of colored pencil leads and at the same time avoiding the expensive firing of pencil leads without substantially lowering the quality. Furthermore, the production of colored pencil leads and lead pencil leads should require only one binding agent, which facilitates mixing.

This problem is solved according to the invention for the production of lead pencils by hardening mixtures of graphite and MgO made at low temperatures from Mg salts with $MgCl_2$ solutions and forming them into leads, pencils or crayons. Colored pencil leads are produced by processing MgO with inorganic or organic colors together with slip additives and $MgCl_2$ solutions into pressable pastes and forming them into leads or crayons.

DETAILED DESCRIPTION OF THE PREFERRED EMBODIMENTS

Surprisingly enough, it has proved possible to produce lead pencil and colored pencil leads as well as chalks with good writing properties at room temperature if the binding agent used is cement, in particular magnesia cement. Mixtures of Sorel's cement, which has been known since 1857, with graphite powder in a weight ratio of 1:1 to 1:7 set even at room temperature, so that extruded or rolled leads harden. These leads have excellent writing properties. The graphite serves as a slip additive here. Sorel's cement is also a suitable binding agent for colored pencil leads, whereby slip additives such as in particular talcum can expediently be mixed in. The resulting leads are of the same quality as the mixtures graphite and Sorel's cement. However, the invention is not limited to $MgO-MgCl_2$ Sorel's cement; other known types of Sorel's cement can also be used, such as $MgO-MgSO_4$, or alternatively $CaO-CaCl_2$.

In the following, examples shall be described which made use of fired magnesite produced by five-hour calcining of $MgCO_3$ at 780° C.

EXAMPLE 1

4 g of MgO was mixed homogeneously with 4 g of graphite, stirred with saturated $MgCl_2$ solution into a compact paste and rolled into sticks. After 12 hours the leads were solid. They showed good writing properties, were easy to sharpen but rather hard.

EXAMPLE 2

2 g of MgO and 10 g of graphite were mixed homogeneously and made into a paste with 4 ml of saturated $MgCl_2$ solution and 2 ml of ethanol, and then treated as in Example 1. Soft pencil leads were obtained.

EXAMPLE 3

Even after pencil leads were produced by mixing 2 g of MgO, 10 g of graphite and 3 g of talcum with $MgCl_2$ solution, extruding the mixture and storing it for 12 hours.

EXAMPLE 4

2 g of MgO, 10 g of talcum and 2 g of $Fe_2O_3$ were ground with 30 ml of ethanol for one hour in a ball mill. After drying the powder was stirred with 8 ml of saturated $MgCl_2$ solution and extruded. After hardening brown-writing leads were obtained which resembled oil chalk and had excellent writing and drawing properties. The leads were very soft.

EXAMPLE 5

The same recipe as in Example 3, except that only 6 g of talcum was used for 2 g of MgO, yielded harder leads.

EXAMPLE 6

A recipe as in Example 3, in which the $Fe_2O_3$ was replaced by the same parts by weight of $Cr_2O_3$, yielded soft green leads.

EXAMPLE 7

2 g of MgO, 10 g of talcum and 0.1 g of methylene blue were ground with 30 ml of ethanol for one hour, dried and mixed with 5 ml of $MgCl_2$ solution and pressed into leads. After hardening soft blue pencils were formed. To increase their resistance to breakage they were covered with wood.

EXAMPLE 8

Like Example 7, except that the replacement of methylene blue by eosin yielded red leads.

We claim:

1. A method for making leads, pencils or crayons, wherein mixtures of graphite and MgO made at low temperatures from Mg salts are made hardenable by $MgCl_2$ solutions and formed into leads, pencils or crayons.

2. A method according to claim 1, wherein a graphite:MgO mixture ratio of 1:1 to 7:1 parts by weight is used.

3. A method according to claim 1, wherein slip additives are used additionally.

4. A method according to claim 3, wherein talcum is used as a slip additive.

5. A method for making colored leads, pencils or crayons, wherein MgO is processed with inorganic or organic colors together with slip additives and $MgCl_2$ solutions into pressable pastes and formed into colored leads, pencils or crayons.

6. A method according to claim 5, wherein colored leads, pencils or crayons are encased to increase their resistance to breakage.

7. A method for making colored leads, pencils or crayons wherein MgO is processed with inorganic or organic colors together with slip additives and $MgSO_4$ solutions into pressable pastes and formed into colored leads, pencils or crayons.

8. A method for making leads, pencils or crayons wherein mixtures of graphite and CaO made at low temperatures from Ca salts are made hardenable by $CaCl_2$ solutions and formed into leads, pencils or crayons.

9. A method according to claim 1, wherein the leads, pencils or crayons are encased to increase their resistance to breakage.

10. A method for making leads, pencils or crayons wherein mixtures of graphite and MgO made at low temperatures from Mg salts are made hardenable by $MgSO_4$ solutions and formed into leads, pencils or crayons.

11. A method for making colored leads, pencils or crayons wherein CaO is processed with inorganic or organic colors together with slip additives and $CaCl_2$ solutions into pressable pastes and formed into colored leads, pencils or crayons.

* * * * *

UNITED STATES PATENT AND TRADEMARK OFFICE
CERTIFICATE OF CORRECTION

PATENT NO. : 4,853,167

DATED : August 1, 1989

INVENTOR(S) : Martin Bard et al.

It is certified that error appears in the above-identified patent and that said Letters Patent is hereby corrected as shown below:

Column 2, line 29, delete "Even after", and insert --Even softer--.

Signed and Sealed this

Thirteenth Day of November, 1990

Attest:

HARRY F. MANBECK, JR.

*Attesting Officer*   *Commissioner of Patents and Trademarks*